(12) United States Patent
Chai

(10) Patent No.: US 12,430,354 B2
(45) Date of Patent: Sep. 30, 2025

(54) DATA COLLECTION METHOD, DEVICE, AND SYSTEM OF SEMICONDUCTOR PROCESSING EQUIPMENT

(71) Applicant: BEIJING NAURA MICROELECTRONICS EQUIPMENT CO., LTD., Beijing (CN)

(72) Inventor: Jiajia Chai, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 22 days.

(21) Appl. No.: 18/687,195

(22) PCT Filed: Aug. 24, 2022

(86) PCT No.: PCT/CN2022/114427
§ 371 (c)(1),
(2) Date: Feb. 27, 2024

(87) PCT Pub. No.: WO2023/030119
PCT Pub. Date: Mar. 9, 2023

(65) Prior Publication Data
US 2024/0427795 A1    Dec. 26, 2024

(30) Foreign Application Priority Data
Aug. 30, 2021    (CN) .......................... 202111007507.6

(51) Int. Cl.
*G06F 16/25*    (2019.01)
(52) U.S. Cl.
CPC ................................ *G06F 16/258* (2019.01)

(58) Field of Classification Search
CPC .... G06F 16/258; G06F 16/903; G06F 16/904; G06F 16/901; G05B 19/4183;
(Continued)

(56) References Cited

U.S. PATENT DOCUMENTS

| 6,070,196 A | 5/2000 | Mullen, Jr. |
| 6,772,034 B1 | 8/2004 | Shi et al. |

(Continued)

FOREIGN PATENT DOCUMENTS

| CN | 101523368 A | 9/2009 |
| CN | 103491059 A | 1/2014 |

(Continued)

OTHER PUBLICATIONS

Albert Fuchigami, "Next-Generation SEMI Equipment Data Acquisition (EDA) Standards", Web Archive Captured Sep. 12, 2018, https://web.archive.org/web/20180912011009/http://www.semi.org/en/next-gen-semi-eda-standards (Year: 2018).*

(Continued)

*Primary Examiner* — Christopher E. Everett
(74) *Attorney, Agent, or Firm* — ANOVA LAW GROUP, PLLC

(57) ABSTRACT

The present disclosure provides a data collection method, a data collection device, and a data collection system of the semiconductor processing equipment. The method includes receiving an activated data collection plan via the first communication interface, determining equipment data information to be collected in the data collection plan, sending the equipment data information to the semiconductor processing equipment via the second communication interface, and receiving equipment data corresponding to the equipment data information sent by the semiconductor processing (Continued)

equipment and forwarding the equipment data to the equipment control system via the first communication interface to display the equipment data.

10 Claims, 12 Drawing Sheets

(58) Field of Classification Search
CPC ...... G05B 2219/45031; G05B 23/0264; H04L 67/12; Y02P 90/02
See application file for complete search history.

(56) References Cited

U.S. PATENT DOCUMENTS

| | | | |
|---|---|---|---|
| 6,970,758 | B1 | 11/2005 | Shi et al. |
| 2002/0087229 | A1* | 7/2002 | Pasadyn ............ G05B 19/41865 700/121 |
| 2003/0083754 | A1* | 5/2003 | Tripathi .................. G05B 15/02 700/20 |
| 2004/0243256 | A1 | 12/2004 | Willis et al. |
| 2004/0250108 | A1* | 12/2004 | Parsons ................ H04M 11/002 726/22 |
| 2005/0047645 | A1* | 3/2005 | Funk ................. G05B 19/41865 382/145 |
| 2005/0171627 | A1* | 8/2005 | Funk ................. H01L 21/67253 700/121 |
| 2014/0129688 | A1* | 5/2014 | Asenjo ................ H04L 41/0813 709/221 |
| 2016/0098037 | A1* | 4/2016 | Zornio ................ H04L 43/045 700/20 |
| 2019/0303807 | A1 | 10/2019 | Gueye |
| 2020/0348273 | A1 | 11/2020 | Michaud |
| 2020/0348662 | A1 | 11/2020 | Cella et al. |
| 2021/0041857 | A1* | 2/2021 | Chaloupka ......... G05B 19/4188 |
| 2024/0427795 | A1 | 12/2024 | Chai |

FOREIGN PATENT DOCUMENTS

| | | |
|---|---|---|
| CN | 207318979 U | 5/2018 |
| CN | 109002021 A | 12/2018 |
| CN | 111885165 A | 11/2020 |
| CN | 113821005 A | 12/2021 |
| CN | 113868484 A | 12/2021 |
| JP | 2017220053 A | 12/2017 |
| TW | 201719544 A | 6/2017 |
| TW | 202044056 A | 12/2020 |

OTHER PUBLICATIONS

Wang, Shaopeng, Youssry Botros, and James W. Martin. "Enabling robustness and flexibility of equipment data collection through SEMI EDA standards." 2004 IEEE/SEMI Advanced Semiconductor Manufacturing Conference and Workshop (IEEE Cat. No. 04CH37530). IEEE, 200 (Year: 2004).*
Hung, Min-Hsiung, Fan-Tien Cheng, and Sze-Chien Yeh. "Development of a web-services-based e-diagnostics framework for semiconductor manufacturing industry." IEEE transactions on semiconductor manufacturing 18.1 (2005): 122-135. (Year: 2005).*
The World Intellectual Property Organization (Wipo) International Search Report for PCT/CN2022/114427 Nov. 1, 2022 8 Pages (including translation).
The European Patent Office (EPO) The Extended European Search Report for U.S. Appl. No. 22863258.4 May 7, 2025 12 Pages.
Intellectual Property Office of Singapore Written Opinion for Application No. 11202400924Q May 19, 2025 7 pages.
Anonymous: "Next-Gen SEMI EDA Standards | semi.org", Sep. 12, 2018 (Sep. 12, 2018), pp. 1-6, http://web.archive.org/web/20180912011009/http://www.semi.org/en/next-gen-semi-eda-standards.

* cited by examiner

| SECS/GEM | Interface A |
|---|---|
| Status variable, Equipment constant, Data variable | Parameter |
| Alarm | Abnormal |
| Event collection (S6, F11) | Event in the data collection plan (DCP) |
| E39 Object | SEMIObjType and example number |
| Track data collection | Tracking in the data collection plan (DCP) |
| Report | Data collection plan/report |
| State machine | State machine |
| Activate/prohibit the event collection | Activate plan/Stop plan |
| Definition and connection report (S2, F33 and S2, F35) | Define the plan |

FIG. 4

| SECS/GEM | EDA/Interface A |
|---|---|
| SECS/GEM only supports connection with one use. | EDA requires to support a plurality of users at the same time. |
| SECS/GEM is only a part of self-description, and detailed document description needs to be added. | EDA performs self-description through the metadata of the E125 standard. |
| SECS/GEM includes data being relatively less hierarchical and less organized. | EDA displays the data hierarchically, and the data is organized according to main hardware assemblies. |
| SECS/GEM information includes data that is highly structured and has poor flexibility. | Because EDA uses XML, addition metadata can be accommodated. |
| SECS/GEM is only applied in a few industries, and professional users are limited globally. | SOAP/XML and HTTP are basis for a majority of internet and intranet applications. |
| SECS/GEM interface is configured to configure and control the equipment. Thus, SECS/GEM interface is closely monitored, and the modification process is lengthy. | EDA is independent of GEM interface. Thus, the dynamic data collection requirement of the engineer is satisfied. |

FIG. 5

DATA COLLECTION METHOD, DEVICE, AND SYSTEM OF SEMICONDUCTOR PROCESSING EQUIPMENT

CROSS-REFERENCE TO RELATED APPLICATIONS

This application is a national phase entry under 35 U.S.C. § 371 of International Application No. PCT/CN2022/114427, filed on Aug. 24, 2022, which claims priority to Chinese Application No. 202111007507.6 filed on Aug. 30, 2021, the entire contents of both of which are incorporated herein by reference.

TECHNICAL FIELD

The present disclosure generally relates to the semiconductor technology field and, more particularly, to a semiconductor processing equipment data collection method, a semiconductor processing equipment data collection device, and a semiconductor processing equipment data collection system.

BACKGROUND

Equipment data acquisition (EDA) standard, also known as Interface A standard, is a set of SEMI standards (Semiconductor Equipment and Materials International standards) designed to facilitate and improve data collection software applications and communication between factory equipment. Factories use the EDA standard to collect specific data from equipment, analyze the data to determine how to enhance productivity, improve quality, and reduce costs. In semiconductor manufacturing, the Equipment Automation Programming (EAP) system controls semiconductor processing equipment for automated production and is integrated with the Manufacturing Execution System (MES) to verify product information, collect process data and equipment parameter data during manufacturing to facilitate enhancing productivity in semiconductor factories, minimizing manual errors, and improving product yield.

In the existing technology, the Advanced Group Controller (AGC) system and the EAP system share a local area network, are connected to the semiconductor processing equipment through an LAN in the factory, and communicate with the semiconductor processing equipment utilizing High-Speed Message Services (HSMS) in the SEMI standard. The AGC server end can be connected to a maximum of 32 pieces of equipment, and the AGC client end can support a maximum of 7 connections. The existing AGC system architecture only includes a data collection capability of processing 2000 pieces of data per second. Thus, the data collection capability is low.

SUMMARY

Based on the above problem, embodiments of the present disclosure provide a data collection method, a data collection device, and a corresponding data collection system of semiconductor processing equipment to overcome the above problem or at least partially solve the above problem.

To solve the above problem, embodiments of the present disclosure provide a data collection method of the semiconductor processing equipment, which is applied to the equipment data collection server. The equipment data collection server can be communicatively connected to the equipment control system via the first communication interface. The equipment data collection server can be communicatively connected to the semiconductor processing equipment via the second communication interface. The method includes:

receiving an activated data collection plan via the first communication interface, the data collection plan being generated by the equipment control system after receiving a definition instruction and being sent after receiving an activation instruction, and the definition instruction and the activation instruction being generated by the equipment control system in response to a user operation;

determining equipment data information to be collected in the data collection plan;

sending the equipment data information to the semiconductor processing equipment via the second communication interface; and receiving equipment data corresponding to the equipment data information sent by the semiconductor processing equipment and forwarding the equipment data to the equipment control system via the first communication interface to display the equipment data.

In some embodiments, the semiconductor processing equipment includes a collection database.

The equipment data is obtained by the collection database using a data collection method corresponding to a data type in the equipment data information, wherein the data type includes a parameter type, an alarm type, and an event type.

In some embodiments, the semiconductor processing equipment further includes a service database.

If the data type is the alarm type, the equipment data is obtained by the collection database from the semiconductor processing equipment; and If the data type is the parameter type or the event type, the equipment data is obtained by the collection database and the service database from the semiconductor processing equipment.

In some embodiments, the equipment control system includes a data structure converter based on an equipment data collection standard; and displaying the equipment data includes performing data format conversion on the equipment data by the data structure converter and displaying the equipment data after the data format conversion by the equipment control system.

In some embodiments, the equipment data collection server includes a third communication interface, the method further comprising:

receiving a control instruction for the semiconductor processing equipment via the third communication interface, the control instruction being generated and sent by control systems other than the equipment control system in response to a user operation; and sending the control instruction to the semiconductor processing equipment via the second communication interface for execution.

In some embodiments, the first communication interface and the second communication interface are communication interfaces based on a Web Service protocol, the equipment data collection server is a server based on an equipment data collection standard, and the equipment control system is an Advanced Group Control (AGC) system.

In some embodiments, the method further includes, after receiving the equipment data corresponding to the equipment data information sent by the semiconductor processing equipment, and before forwarding the equipment data to the equipment control system via the first communication interface to display the equipment data:

determining whether the equipment data is equipment data to be collected in the activated data collection plan; and if yes, forwarding the equipment data to the equipment control system via the first communication interface to display the equipment data.

Embodiments of the present disclosure further provide a data collection method of semiconductor processing equipment, applied to an equipment control system. The equipment control system is communicatively connected to an equipment data collection server via a first communication interface, and the equipment control system is communicatively connected to the semiconductor processing equipment via a second communication interface. The method includes:

responding to a user operation to generate a corresponding definition instruction and a data collection plan according to the definition instruction;

responding to the user operation to generate a corresponding activation instruction and activate the data collection plan according to the activation instruction;

sending the activated data collection plans to the equipment data collection server via the first communication interface;

receiving the equipment data returned by the equipment data collection server via the first communication interface, the equipment data being sent to the equipment data collection server by the semiconductor processing equipment according to equipment data information after the equipment data collection server determines the equipment data information to be collected in the data collection plan and sends the equipment data information to the semiconductor processing equipment via the second communication interface; and displaying the equipment data.

In some embodiments, the semiconductor processing equipment includes a collection database; and the equipment data is obtained by the collection database using a data collection method corresponding to a data type in the equipment data information, wherein the data type includes a parameter type, an alarm type, and an event type.

In some embodiments, the semiconductor processing equipment further includes a service database;

if the data type is alarm type, the equipment data is obtained by the collection database from the semiconductor processing equipment; and if the data type is the parameter type or event type, the device data is obtained by the collection database and the service database from the semiconductor processing equipment.

In some embodiments, the equipment control system includes a data structure converter based on an equipment data collection standard; and displaying the equipment data includes displaying the equipment data after the data structure converter performs data format conversion.

Embodiments of the present disclosure further provide a data collection device of semiconductor processing equipment, applied to an equipment data collection server, the equipment data collection server is communicatively connected to the equipment control system via a first communication interface, and the equipment data collection server is communicatively connected to the semiconductor processing equipment via a second communication interface. The device includes:

a first control unit configured to receive an activated data collection plan via the first communication interface, the data collection plan being generated by the equipment control system after receiving a definition instruction and being sent after receiving an activation instruction, and the definition instruction and the activation instruction being generated by the equipment control system in response to a user operation, determine equipment data information to be collected in the data collection plan, send the equipment data information to the semiconductor processing equipment via the second communication interface, and receive equipment data corresponding to the equipment data information sent by the semiconductor processing equipment and forwarding the equipment data to the equipment control system via the first communication interface to display the equipment data.

In some embodiments, the semiconductor processing equipment includes a collection database.

The equipment data is obtained by the collection database using a data collection method corresponding to a data type in the equipment data information, wherein the data type includes a parameter type, an alarm type, and an event type.

In some embodiments, the semiconductor processing equipment further includes a service database. If the data type is the alarm type, the equipment data is obtained by the collection database from the semiconductor processing equipment. If the data type is the parameter type or the event type, the equipment data is obtained by the collection database and the service database from the semiconductor processing equipment.

In some embodiments, the equipment control system includes a data structure converter based on an Interface A standard; and displaying the equipment data includes performing data format conversion on the equipment data by the data structure converter and displaying the equipment data after the data format conversion by the equipment control system.

In some embodiments, the equipment data collection server includes a third communication interface. The first control unit is configured to receive a control instruction for the semiconductor processing equipment via the third communication interface. The control instruction is generated and sent by other control systems other than the equipment control system in response to a user operation. The first control unit is further configured to send the control instruction to the semiconductor processing equipment via the second communication interface for execution.

In some embodiments, the first communication interface and the second communication interface are communication interfaces based on a Web Service protocol, the equipment data collection server is a server based on an equipment data collection standard, and the equipment control system is an Advanced Group Control (AGC) system.

In some embodiments, the first control unit is configured to determine whether the equipment data is equipment data to be collected in the activated data collection plan. If yes, the equipment data is forwarded to the equipment control system via the first communication interface to display the equipment data.

Embodiments of the present disclosure further provide another data collection device of the semiconductor processing equipment, applied to the equipment control system. The equipment data collection server is communicatively connected to the equipment control system via a first communication interface, and the equipment data collection server is communicatively connected to the semiconductor processing equipment via a second communication interface. The device includes:

a second control unit configured to respond to a user operation to generate a corresponding definition instruction and a data collection plan according to the definition instruction, respond to the user operation to generate a corresponding activation instruction and activate the data collection plan according to the activation instruction, send the activated data collection plans to the equipment data collection server via the first communication interface, receive the equipment data returned by the equipment data collection server via the first communication interface, the equipment data being sent to the equipment data collection server by the semiconductor processing equipment according to equipment data information after the equipment data collection server determines the equipment data information to be collected in the data collection plan and sends the equipment data information to the semiconductor processing equipment via the second communication interface, and display the equipment data.

In some embodiments, the semiconductor processing equipment includes a collection database, and the equipment data is obtained by the collection database using a data collection method corresponding to a data type in the equipment data information, wherein the data type includes a parameter type, an alarm type, and an event type.

In some embodiments, the semiconductor processing equipment further includes a service database. If the data type is alarm type, the equipment data is obtained by the collection database from the semiconductor processing equipment. If the data type is the parameter type or event type, the device data is obtained by the collection database and the service database from the semiconductor processing equipment.

In some embodiments, the equipment control system includes a data structure converter based on an Interface A standard. The second control unit is configured to display the equipment data after the data structure converter performs data format conversion.

Embodiments of the present disclosure provide a data collection system of the semiconductor processing equipment including the equipment data collection server and the equipment control system. The equipment data collection server is communicatively connected to the equipment control system via a first communication interface. The equipment data collection server is communicatively connected to the semiconductor processing equipment via a second communication interface.

The equipment control system is configured to respond to a user operation to generate a corresponding definition instruction and generate a data collection plan according to the definition instruction, respond to a user operation to generate a corresponding activation instruction activate the data collection plan according to the activation instruction, and send the activated data collection plan to the equipment data collection server via the first communication interface.

The equipment data collection server is configured to determine equipment data information to be collected in the data collection plan, send the equipment data information to the semiconductor processing equipment via the second communication interface, receive the equipment data corresponding to the equipment data information sent by the semiconductor processing equipment, and send the equipment data to the equipment control system via the first communication interface.

The equipment control system is further configured to display the equipment data.

Embodiments of the present disclosure include the following advantages.

In embodiments of the present disclosure, the equipment data collection server can be communicatively connected to the equipment control system and perform the equipment data collection task issued by the equipment control system for the semiconductor processing equipment. In the method, the equipment data can be collected by the equipment data collection server, and the factory automated control may not be needed to collect the data. Thus, the data collection pressure at the software application at the factory end, and the communication method between the factory end and the equipment can be improved.

BRIEF DESCRIPTION OF THE DRAWINGS

FIG. 4 illustrates a schematic diagram of a mapping table of EDA/Interface and SECS/GEM according to embodiments of the present disclosure.

FIG. 5 illustrates a schematic diagram of a comparison table of EDA/Interface and SECS/GEM according to embodiments of the present disclosure.

DETAILED DESCRIPTION OF THE EMBODIMENTS

To make the above objectives, features, and advantages of the present disclosure more apparent and understandable, the present disclosure is further described in detail in connection with the accompanying drawings and specific embodiments. Apparently, the described embodiments are merely some embodiments of the present disclosure, not all embodiments. Based on embodiments of the present disclosure, all other embodiments obtained by those skilled in the art are within the scope of the present disclosure.

An Equipment Data Acquisition (EDA, also referred to as Interface A) standard is a set of SEMI (Semiconductor Equipment and Materials International) standards. The EDA standard cannot replace the SEMI GEM/SECS standard (E4, E5, E30, and E37) or the SEMI GEM 300 standard (E39, E40, E87, E90, E94, E116, E148, and E157), because the EDA standard does not provide functions of controlling or configuring equipment.

The Interface A standard can include a plurality of SEMI standards, such as an E120 Common Equipment Model (CEM) specification, an E125 Equipment Self-Description (EQSD) specification, an E128 synchronous/asynchronous message header definition specification for sending/receiving messages, an E132 equipment user acceptance and authorization specification, an E134 data collection management specification, an E138 parameter type definition specification, and an E164 EDA common metadata specification.

Figure 1:
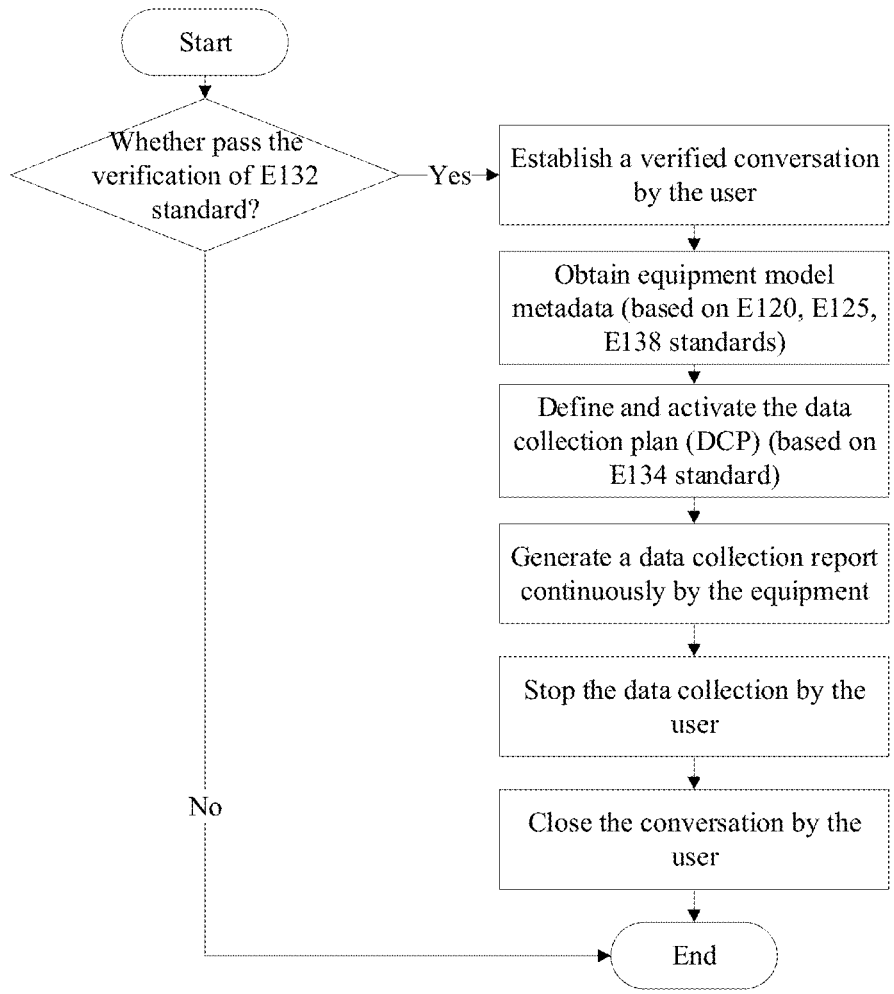
FIG. 1 illustrates a schematic flowchart of a user performing equipment operation based on an EDA/Interface A standard according to some embodiments of the present disclosure.

Through network services, equipment and factory-user application implementation interfaces using SOAP/XML information can be connected via HTTP or HTTPS and must adhere to specific SOAP/XML implementation standards E120.1, E125.1, E132.1, and E134.1. FIG. 1 illustrates a schematic flowchart of a user performing equipment operation based on an EDA/Interface A standard according to some embodiments of the present disclosure.

Figure 2:
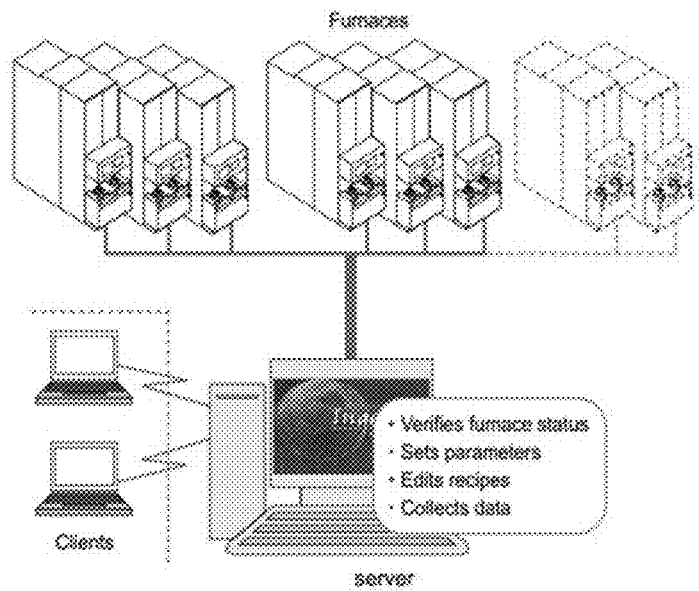
FIG. 2 illustrates a schematic structural diagram of an AGC system according to embodiments of the present disclosure.
Figure 3:
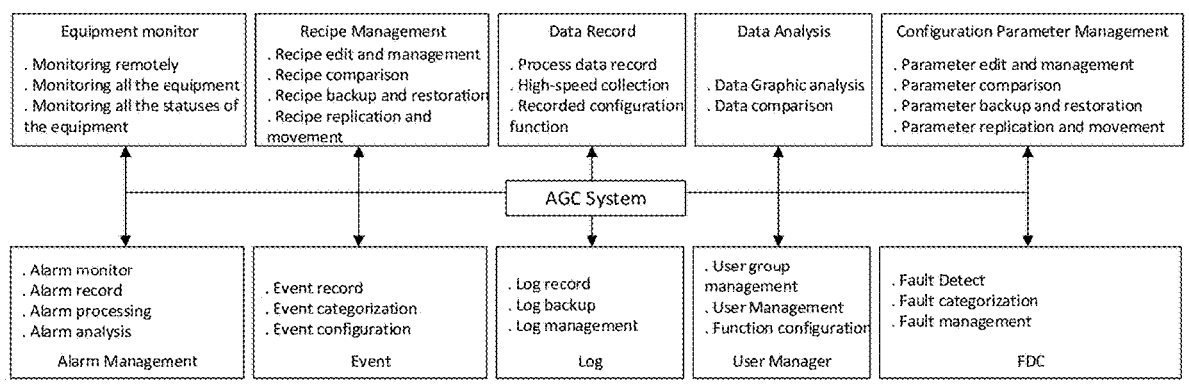
FIG. 3 illustrates a schematic diagram showing a function of an AGC system according to embodiments of the present disclosure.

An advantage group controller (AGC) is an advanced group control system independent of the control system running on the equipment. The equipment can be monitored and managed through the AGC system. FIG. 2 illustrates a schematic structural diagram of an AGC system according to embodiments of the present disclosure. The AGC system includes a service end and a client end. FIG. 3 illustrates a schematic diagram showing a function of an AGC system according to embodiments of the present disclosure. The AGC system can remotely monitor and manage all the semiconductor processing equipment in the FAB and perform data statistics and analysis, including Alarm management, Event management, and configuration parameter management.

By mapping Interface A to SECS/GEM, FIG. 4 illustrates a schematic diagram of a mapping table of EDA/Interface and SECS/GEM according to embodiments of the present disclosure. The application concept of EDA (Interface A) is similar to SECS/GEM. FIG. 5 illustrates a schematic diagram of a comparison table of EDA/Interface and SECS/GEM according to embodiments of the present disclosure. The EDA is equipment data acquisition and is mainly configured to collect the equipment data at the factory end. SECS/GEM is an equipment communication standard. EDA/Interface A can have obvious application advantages compared to SECS/GEM.

Figure 6:
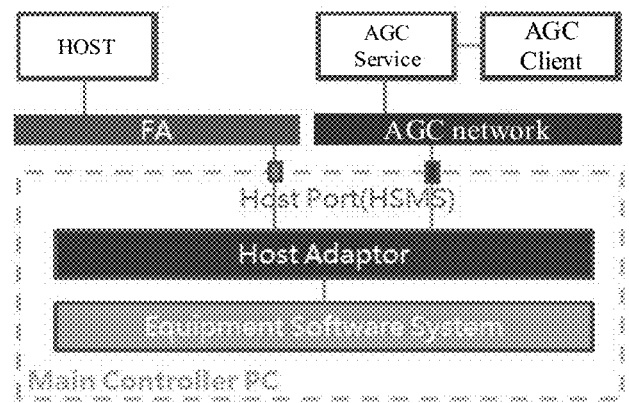
FIG. 6 illustrates a schematic technical architectural diagram of an AGC system according to embodiments of the present disclosure.

FIG. 6 illustrates a schematic technical architectural diagram of an AGC system according to embodiments of the present disclosure. Functions of modules of the AGC system are described as follows.

A HOST module is an EAP system at the semiconductor factory (FAB) end and is configured to issue an instruction to an FA (factory automation) module.

The FA (Factory Automation) module is configured to implement the automation at the factory end. The FA module transfers the instruction received from the HOST end to the equipment control system (i.e., Main Controller PC in FIG. 6) of the semiconductor processing equipment through the equipment end interface HostPort.

The HostPort module is the communication port between the FA module and the equipment software system of the equipment control system of the semiconductor processing equipment using the HSMS communication protocol (High-Speed SECS Message Service defined on Ethernet-based TCP/IP protocol).

A Host adaptor module is configured to be connected to the AGC system.

The equipment software system module is the equipment software system of the equipment control system of the above semiconductor processing equipment, which includes applications such as a cluster tool controller (CTC) and a lower-level machine.

An AGC network module converts collected data into a data structure usable by the AGC and transfers the data to the AGC Service.

The AGC Service is an AGC server end.

The AGC Client is an AGC client end.

Figure 7:
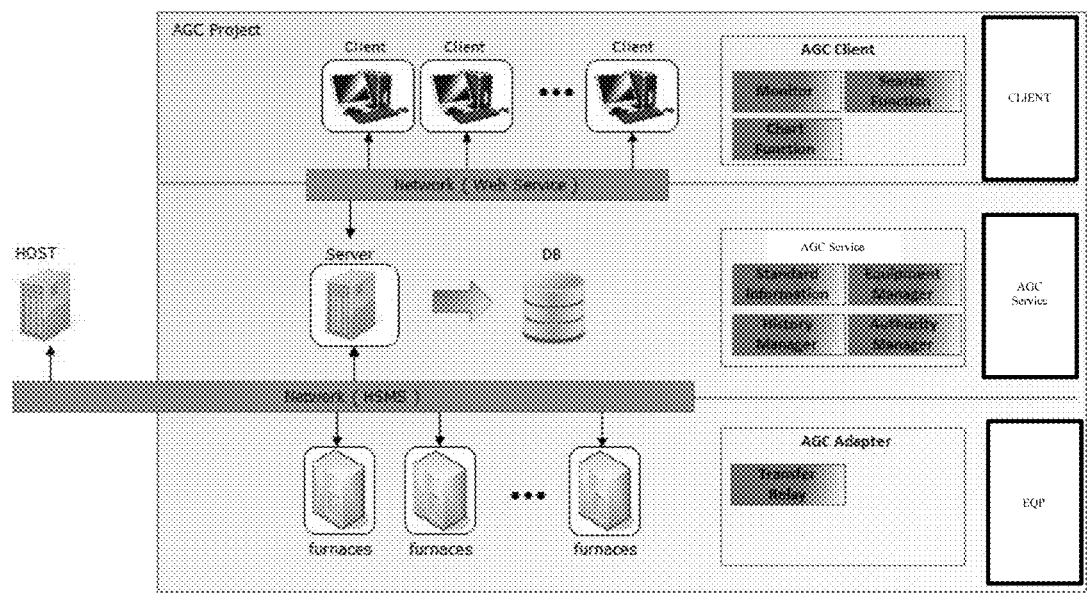
FIG. 7 illustrates a schematic structural diagram of an AGC system according to embodiments of the present disclosure.

FIG. 7 illustrates a schematic structural diagram of an AGC system according to embodiments of the present disclosure. The functions of the modules of the AGC system are described as follows.

Furnaces are vertical furnace equipment, which is a type of semiconductor processing equipment.

HOST is an EAP system at the semiconductor factory (FAB) end.

Service is the server of the AGC system. One Service can be connected to a plurality of furnaces.

DB (database) is the database used to store the data of the Service.

Network (HSMS) is a network communication standard between the Service and the furnaces.

Client is the client end of the AGC system. A plurality of Clients can simultaneously access the Service of the AGC system.

Network (Web Service) is the network communication protocol used between the Client (client end) of the AGC system and the Service (server end) of the AGC system based on Web Service.

Since the current equipment only has one network port, the AGC system and the EAP system (i.e., the HOST module in FIG. 6) share the same LAN, are connected to the vertical furnace equipment (furnaces) through the LAN in the factory, and perform communication using the HSMS in the SEMI standard. Currently, the Service (server end) of the AGC system can be connected to a maximum of 32 pieces of equipment (furnaces), and the Client (client end) of the AGC system can be connected to a maximum of 7 pieces of equipment (furnaces).

The current AGC system can collect data from the FA module. The FA module can obtain the data from the CTC (the equipment control application in the equipment software system in FIG. 6) of the equipment software system through a Bridge. When a piece of equipment is connected to the AGC system, a communication channel connecting to the FA module needs to be started. Thus, 32 communication channels connecting to the FA module may be needed for connecting 32 pieces of equipment. Therefore, the pressure of collecting the data can accumulate in the FA system. The FA system may need to control the functions of the equipment and perform data collection additionally. In the existing AGC system architecture, the current AGC system can only have the data collection capability of processing 2000 pieces of data per second. However, an AGC system with the collection capability of 10 HZ, i.e., collecting 1000 pieces of data per 100 milliseconds, or even higher collection capability can be needed.

Based on this, the present disclosure provides a semiconductor processing equipment data collection method, a semiconductor processing equipment data collection device, and a semiconductor processing equipment data collection system to at least partially solve the above problems.

One of the core concepts of embodiments of the present disclosure can include, by communicatively connecting the equipment data collection server and the equipment control system, performing the equipment data collection task for the semiconductor processing equipment. In this method, the equipment data collection server is configured to collect the equipment data, and the factory automated control system does not need to collect the equipment data to reduce the data collection pressure of the application at the factory end and improve the communication between the factory end and the equipment end.

Figure 8:
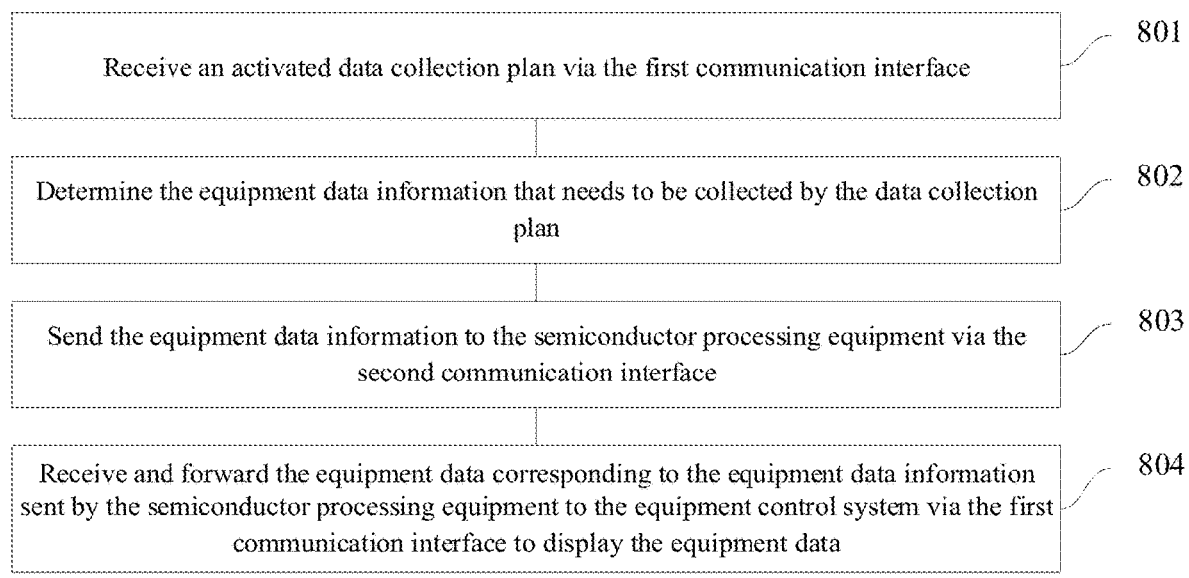
FIG. 8 illustrates a schematic flowchart of a semiconductor processing equipment data collection method according to embodiments of the present disclosure.

FIG. 8 illustrates a schematic flowchart of a semiconductor processing equipment data collection method according to embodiments of the present disclosure. The method is applied to the equipment data collection server. The equipment data collection server can be communicatively connected to the equipment control system through the first communication interface. The equipment data collection server can be communicatively connected to the semiconductor processing equipment through the second communication interface. The method includes the following processes.

At 801, an activated data collection plan is received via the first communication interface.

The data collection plan is generated after the equipment control system receives a definition instruction and is sent after receiving an activation instruction. The definition instruction and the activation instruction can be generated by the equipment control system in response to the operation of the user.

The user can perform a corresponding operation at the client end of the equipment control system to generate the definition instruction. The definition instruction can be used to define the data collection plan. After the client end of the equipment control system generates the corresponding data collection plan according to the definition instruction, the client end can send the data collection plan to the server end of the equipment control system. The server end can determine whether the data collection plan meets the requirements, such as authorization requirements. If the data collection plan meets the requirements, the server end can generate the corresponding activation instruction according to the operation of the user. The activation instruction can be used to activate the data collection plan.

In embodiments of the present disclosure, the equipment data collection server can be a server based on the EDA standard, and the equipment control system can be an AGC system. The equipment data collection server can be independent of the factory automation control system. After generating and activating the data collection plan, the equipment control system can send the data collection plan to the equipment data collection server via the first communication interface. The equipment data collection server can be configured to perform the data collection.

At 802, the equipment data information that needs to be collected by the data collection plan is determined.

The equipment data collection server can be configured to determine the equipment data information that needs to be collected by the data collection plan.

At 803, the equipment data information is sent to the semiconductor processing equipment via the second communication interface.

In embodiments of the present disclosure, the equipment data collection server can send the equipment data information to the semiconductor processing equipment via the second communication interface. Both the first and second communication interfaces can be the communication interfaces based on the Web Service protocol.

At 804, the equipment data corresponding to the equipment data information sent by the semiconductor processing equipment is received and forwarded to the equipment control system via the first communication interface to display the equipment data.

In embodiments of the present disclosure, the equipment data collection server can receive the equipment data corresponding to the equipment data information returned from the semiconductor processing equipment via the second communication interface. The equipment data collection server can send the equipment data to the equipment control system via the first communication interface. The equipment control system can display the equipment data.

In summary, in embodiments of the present disclosure, by communicatively connecting the equipment data collection server to the equipment control system, the equipment data collection task for the semiconductor processing equipment issued by the equipment control system can be performed. In this method, the equipment data collection server can be configured to collect the equipment data, and the factory automated control system is not needed for data collection. Thus, the data collection pressure of the software application at the factory end can be reduced, and the communication method between the factory end and the equipment end can be improved.

Figure 9:
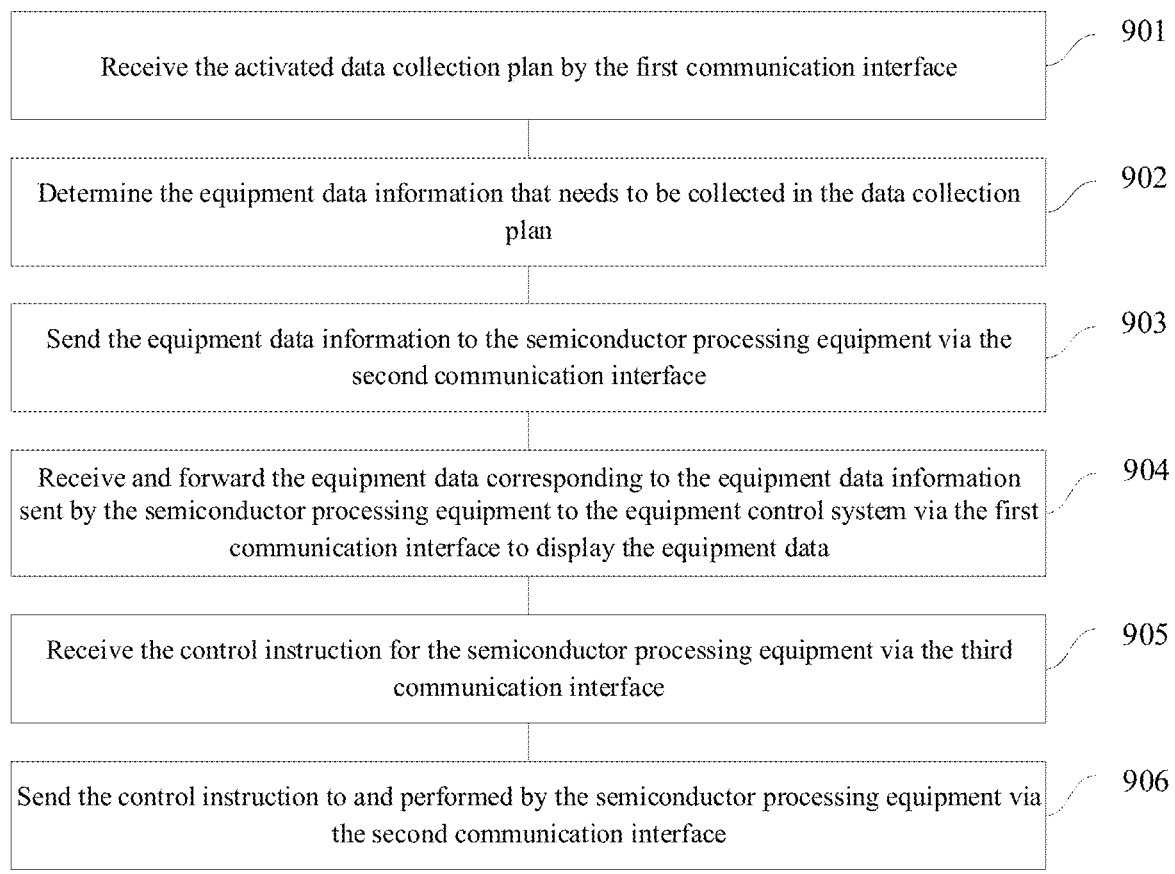
FIG. 9 illustrates a schematic flowchart of another semiconductor processing equipment data collection method according to embodiments of the present disclosure.

FIG. 9 illustrates a schematic flowchart of another semiconductor processing equipment data collection method according to embodiments of the present disclosure. The method is applied to the equipment data collection server. The equipment data collection server is communicatively connected to the equipment control system through the first communication interface. The equipment data collection server is communicatively connected to the semiconductor processing equipment through the second communication interface. The method includes the following processes.

At 901, the activated data collection plan is received by the first communication interface.

The data collection plan can be generated by the equipment control system after receiving the definition instruction and can be sent by the equipment control system after receiving the activation instruction. The definition instruction and the activation instruction can be generated by the equipment control system in response to the user operations.

In embodiments of the present disclosure, the equipment data collection server can be a server based on the EDA standard, and the equipment control system can be an AGC system. After generating and activating the data collection plan, the equipment control system can send the data collection plan to the equipment data collection server via the first communication interface. The data collection can be performed by the equipment data collection server.

The equipment data collection server can use the EDA/Interface A standard. The EDA is a standard defined by SEMI and used to collect data and support a plurality of clients in parallel. Thus, the data collection efficiency at the client ends can be simultaneously improved, the running performance of platform software can be improved, and the user experience can be further improved.

In some embodiments, the equipment data collection server can communicate with the collection database. The collection database can be a database of the semiconductor processing equipment providing services for the EDA server.

At 902, the equipment data information that needs to be collected in the data collection plan is determined.

The equipment data collection server can determine the equipment data information that needs to be collected in the data collection plan.

At 903, the equipment data information is sent to the semiconductor processing equipment via the second communication interface.

The equipment data collection server can send the equipment data information to the semiconductor processing equipment via the second communication interface. The first communication interface and the second communication interface can be communication interfaces based on the Web Service protocol. By using the Web Service communication, the communication performance can be stable.

At 904, the equipment data corresponding to the equipment data information sent by the semiconductor processing equipment is received and forwarded to the equipment control system via the first communication interface to display the equipment data.

In embodiments of the present disclosure, the equipment data collection server can receive the equipment data corresponding to the equipment data information returned from the semiconductor processing equipment via the second communication interface and send the equipment data to the equipment control system via the first communication interface. The equipment control system can display the equipment data.

In some embodiments, the semiconductor processing equipment can include a collection database. The equipment data can be obtained by the collection database using the data collection method corresponding to the data type of the equipment data information. The data type can include a parameter type, a warning type, and an event type.

In embodiments of the present disclosure, the collection database can determine the data collection method according to the data type in the equipment data information and obtain the equipment data in the data collection method.

In some embodiments, after the collection database obtains the equipment data, whether the equipment data is the subscribed data may need to be verified first. After the verification is successful, the equipment data can be sent to the equipment data collection server.

Therefore, the equipment data can be sent after the collection database subscription verification is successful.

In some embodiments, the semiconductor processing equipment can also include a service database. If the data type is the alarm type, the equipment data can be obtained from the semiconductor processing equipment by the collection database. If the data type is the parameter type or event type, the equipment data can be obtained from the semiconductor processing equipment through the collection database and the service database.

The service database can centrally manage the parameters and event associated with the semiconductor processing equipment.

In embodiments of the present disclosure, the data type can be determined. When the data type is the alarm type, the corresponding equipment data can be obtained directly from the collection database. When the data type is the parameter type or event type, the collection database and the service database may need to perform data collection and control at the semiconductor processing equipment end.

In some embodiments, the equipment control system can include a data structure converter based on the Interface A standard. In some embodiments, displaying the equipment data includes performing the data format conversion on the equipment data by the data structure converter and displaying the equipment data after the data format conversion by the equipment control system.

In embodiments of the present disclosure, the data structure converter can convert the data format of the equipment data into a format supported by the equipment control system, such as the data format supported and displayed by the AGC system. The equipment data after the data format conversion can be displayed on the equipment control system, such as the AGC system.

In some embodiments, after receiving the equipment data corresponding to the equipment data information sent by the semiconductor processing equipment and forwarding the equipment data to the equipment control system through the first communication interface. Thus, before displaying the equipment data, the method further includes determining whether the equipment data is the equipment data required by the data collection plan. If yes, the equipment data can be forwarded to the device control system via the first communication interface to display the equipment data.

In some embodiments, the equipment data collection server can determine whether the received equipment data is the equipment data required by the Data Collection Plan (DCP).

In embodiments of the present disclosure, the equipment data collection server can further include a third communication interface.

At 905, the control instruction for the semiconductor processing equipment is received via the third communication interface.

These control instructions can be generated and sent by another control system except for the equipment control system in response to the user operations.

At 906, the control instruction is sent to and performed by the semiconductor processing equipment via the second communication interface.

In embodiments of the present disclosure, the third communication interface can be added to the equipment data collection server to implement some control functions of the FA required by the AGC system. That is, after the equipment data collection server is communicatively connected to other control systems via the third communication interface, the equipment data collection server can receive the control instruction for the semiconductor processing equipment sent by the other control systems and then send the control instruction to the semiconductor processing equipment for execution via the second communication interface. The control instruction can be the operation instruction included in the FA system not in the AGC system. Thus, the semiconductor processing equipment can realize a similar control function to the FA.

To help those skilled in the art better understand steps 901 to 906 in embodiments of the present disclosure, which are described through the following example.

Figure 10:
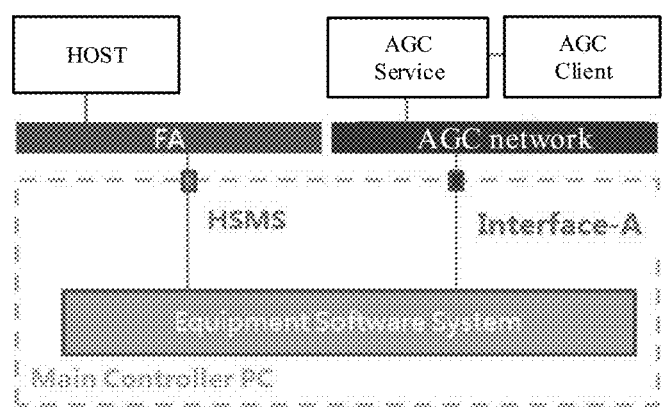
FIG. 10 illustrates a schematic architectural diagram of a system for a semiconductor processing equipment data collection method according to embodiments of the present disclosure.
Figure 11:
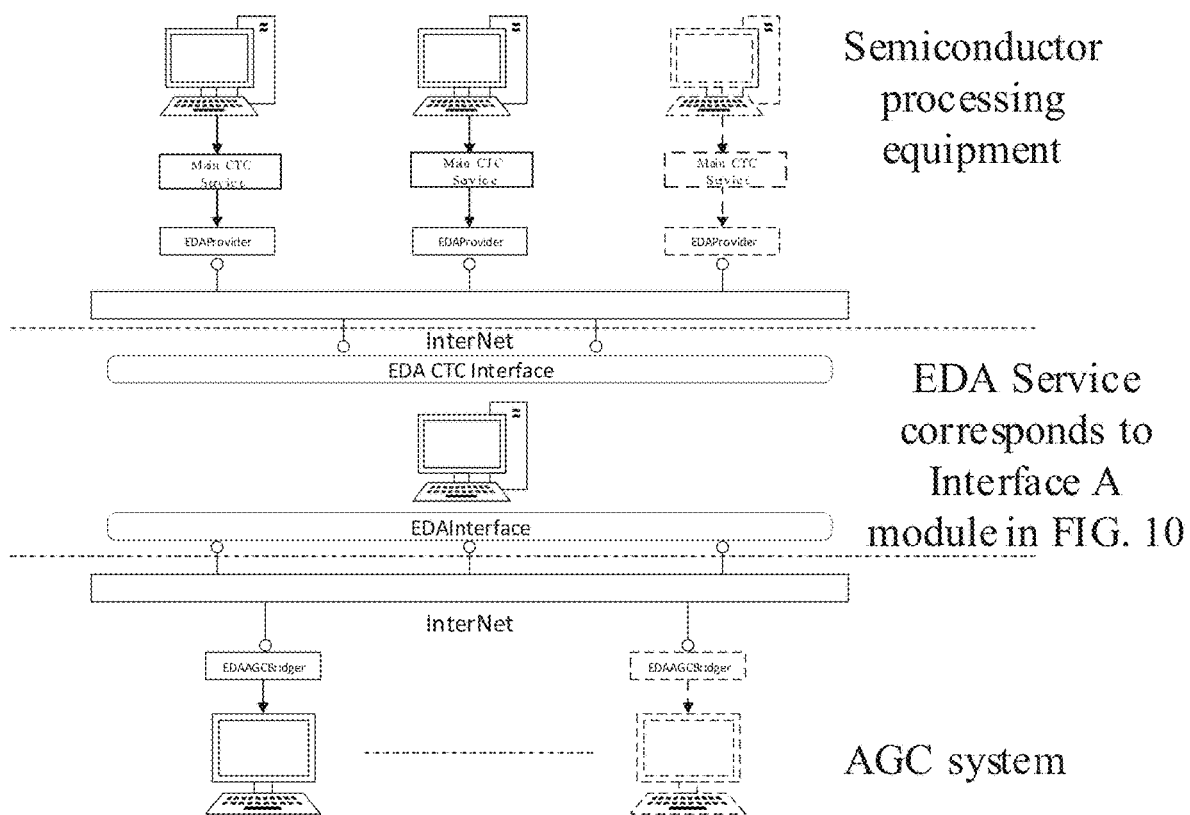
FIG. 11 illustrates a schematic structural diagram of a system for a semiconductor processing equipment data collection method according to embodiments of the present disclosure.

FIG. 10 illustrates a schematic architectural diagram of a system for a semiconductor processing equipment data collection method according to embodiments of the present disclosure. FIG. 11 illustrates a schematic structural diagram of a system for a semiconductor processing equipment data collection method according to embodiments of the present disclosure. The functions of the modules of the system are described as follows.

The semiconductor processing equipment includes an equipment control system (i.e., Main Controller PC in FIG. 6). The equipment control system includes an equipment software system (i.e., the equipment software system module in FIG. 10). The equipment software system includes a cluster tool controller (CTC).

The Main CTC Service (Service Database) is connected to the database of the semiconductor processing equipment and associated with the central management of the parameter and event.

The EDA Provider (Collection Database) is the database of the semiconductor processing equipment for providing services to the EDA.

The EDA CTC Interface (second communication interface) is the interface for communication between the equipment data collection (EDA) server and the EDA provider.

The EDA Interface (first communication interface) is the service interface provided by the equipment data collection (EDA) server.

The EDA AGC Bridge (data structure converter) is a data structure converter between the EDA server and the AGC system, similar to an EDA client end.

The AGC System includes an AGC Service end and an AGC Client end.

The data collection process implemented using the system architecture includes the following steps (assuming that the EDA server, the AGC system, and the semiconductor processing equipment are all started normally).

1. The AGC system defines the Data Collection Plan (DCP) to be collected and activates the DCP to be collected.
2. The EDA server (EDA Service) determines the equipment data information to be collected according to the DCP activated by the AGC system and sends the equipment data information via the second communication interface (EDA CTC Interface).
3. The collection database (EDA Provider) receives the equipment data information to be collected, and divides the data types. The Alarm type is directly controlled and obtained from the collection database (EDA Provider). The Parameter type and the Event type are controlled and obtained jointly by the collection database and the service database (Main CTC Service) at the CTC equipment end.
4. When an Alarm (or Event) is triggered, the EDA Provider receives the equipment data of the Alarm (or Event) and then determines whether the equipment data is subscribed to. If yes, the equipment data is transmitted back to the EDA Service via the EDA CTC Interface.
5. The EDA Service determines that the equipment data of the Alarm (or Event) is the equipment data that needs to be collected in the activated DCP, and then transmits the equipment data to the data structure converter (EDA AGC Bridge) via the EDA Interface.
6. The EDA AGC Bridge converts the obtained equipment data into a data format supported by the AGC system and displays the equipment data at the AGC end.

In embodiments of the present disclosure, the EDA server, which communicates based on the Web Service, can be created to obtain the collection database (EDA Provider) of the equipment data from the semiconductor processing equipment end, e.g., the CTC equipment end. The Main CTC Service database directly connected to the CTC equipment end can be created to be associated with the central management of the Parameter and Event at the CTC end. The data structure converter (EDA AGC Bridge), which is integrated into the AGC system based on the EDA server based on the Interface A standard, can be created. The third communication interface can be added to the EDA server to implement some control functions of the FA required in the AGC system.

By comparing FIG. 6 with FIG. 10, by using the present disclosure to replace the data collection method of the existing technology architecture of using the HSMS for communication to convert to the Web Service communication method based on the Interface A standard, the Host Adaptor communication converter is no longer needed. The previous data collection is implemented by the FA, and the FA needs the Host Adaptor to connect a plurality of HOST ends. After the data collection is performed based on the Interface A standard, one equipment data collection server can be connected to a plurality of client ends and is independent of the control of the FA. Thus, the factory end can perform the equipment data collection via the FA. The data collection can be no longer performed using the FA and can be completely performed by the EDA server. The FA collecting the data at the CTC equipment end through the Bridge can be converted to the EDA server collecting the data at the CTC equipment end through the EDA Provider and the Main CTC Service. Since the EDA is a dedicated data collection function item based on the SEMI Interface standard and does not have the equipment control function, when the equipment control function is required, a customized interface of the part of the control function required by the AGC system can be provided at the EDA server. According to the different data structure types of the AGC system and the EDA server, the EDA based on the Interface A standard can be created to be integrated into the data structure converter EDA AGC Bridge of the AHC system. Through the data structure converter EDA AGC Bridge, the AGC system can obtain the equipment data collected by the EDA server and can also control the equipment at the same time.

In summary, in embodiments of the present disclosure, the equipment data collection server can be communicatively connected to the equipment control system to perform the equipment data collection task issued by the equipment control system for the semiconductor processing equipment. In this method, the equipment data collection server can be configured to collect the equipment data, and the data may not need to be collected by the factory automated control system, which can reduce the data collection pressure of the software application at the factory end, improve the communication method between the data collection application and the equipment end, improves the data collection performance, and satisfy the requirement of the big data collection. The improved AGC system architecture for collecting data based on EDA can completely replace the data collection method using the HSMS for communication. The data can be collected using the Interface A standard to greatly improve the equipment collection efficiency and data exchange rate and reduce the data collection pressure of the FA in real-time. After verification, by using the technical solution of the present disclosure, the data collection capability of the AGC system can be greatly improved, and the CPU resource utilization rate of the CTC can be less than 2%.

Figure 12:
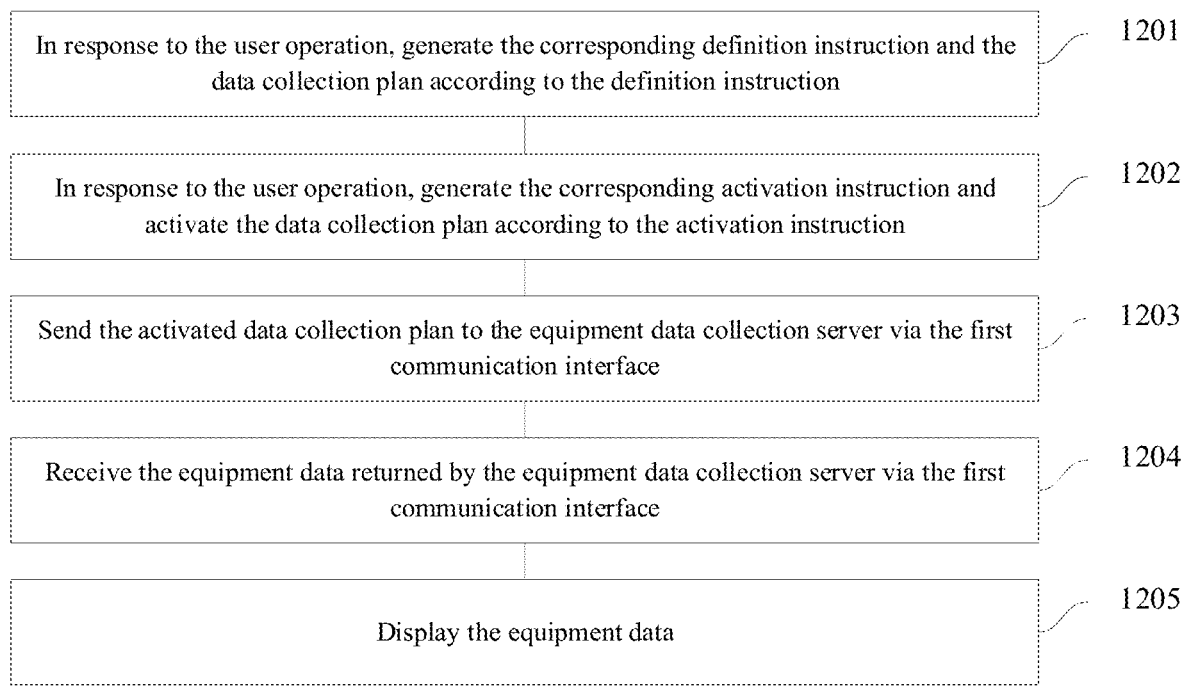
FIG. 12 illustrates a schematic flowchart of another semiconductor processing equipment data collection method according to embodiments of the present disclosure.

FIG. 12 illustrates a schematic flowchart of another semiconductor processing equipment data collection method according to embodiments of the present disclosure. The method is applied to the equipment control system. The equipment control system can be communicatively connected to the equipment data collection server via the first communication interface. The equipment data collection server can be communicatively connected to the semiconductor processing equipment via the second communication interface. The method includes the following processes.

At 1201, in response to the user operation, the corresponding definition instruction is generated, and the data collection plan is generated according to the definition instruction.

The first communication interface and the second communication interface can be the communication interfaces based on the Web Service protocol. The equipment data collection server can be the server based on the EDA standard. The equipment control system can be the AGC system.

At 1202, in response to the user operation, the corresponding activation instruction is generated, and the data collection plan is activated according to the activation instruction.

At 1203, the activated data collection plan is sent to the equipment data collection server via the first communication interface.

At 1204, the equipment data returned by the equipment data collection server is received via the first communication interface.

The equipment data can be sent to the equipment data collection server by the semiconductor processing equipment according to the equipment data information after the equipment data collection server determines the equipment data information to be collected in the data collection plan and sends the equipment data information to the semiconductor processing equipment via the second communication interface.

At 1205, the equipment data is displayed.

In some embodiments, the semiconductor processing equipment can include a collection database.

The equipment data can be obtained by the collection database in the data collection method corresponding to the data type of the equipment data information. The data type can include the parameter type, the warning type, and the event type.

In some embodiments, the semiconductor processing equipment can further include the service database.

If the data type is the alarm type, the equipment data can be obtained by the collection database from the semiconductor processing equipment. If the data type is the parameter type or the event type, the equipment data can be obtained by the collection database and the service database from the semiconductor processing equipment.

In some embodiments, the equipment control system can include the data structure converter based on the Interface A standard. Displaying the equipment data can include displaying the equipment data after the data format is converted by the data structure converter.

In some embodiments, the equipment data after the data format is converted can be displayed by the equipment control system.

It should be noted that the description of embodiments of the present disclosure is based on a data collection method of the semiconductor processing equipment performed at the equipment control system end. For the detailed execution process of the method, reference can be made to the description of the execution process based on the equipment data collection server end. To avoid repetition, only a brief explanation is provided here.

In summary, in embodiments of the present disclosure, the equipment data collection server can be communicatively connected to the equipment control system to perform the equipment data collection task issued by the equipment control system for the semiconductor processing equipment. In this method, the equipment data collection server can be configured to collect the equipment data, and the data may not need to be collected by the factory automated control system, which can reduce the data collection pressure of the software application at the factory end and improve the communication method between the data collection application and the equipment end.

Figure 13:
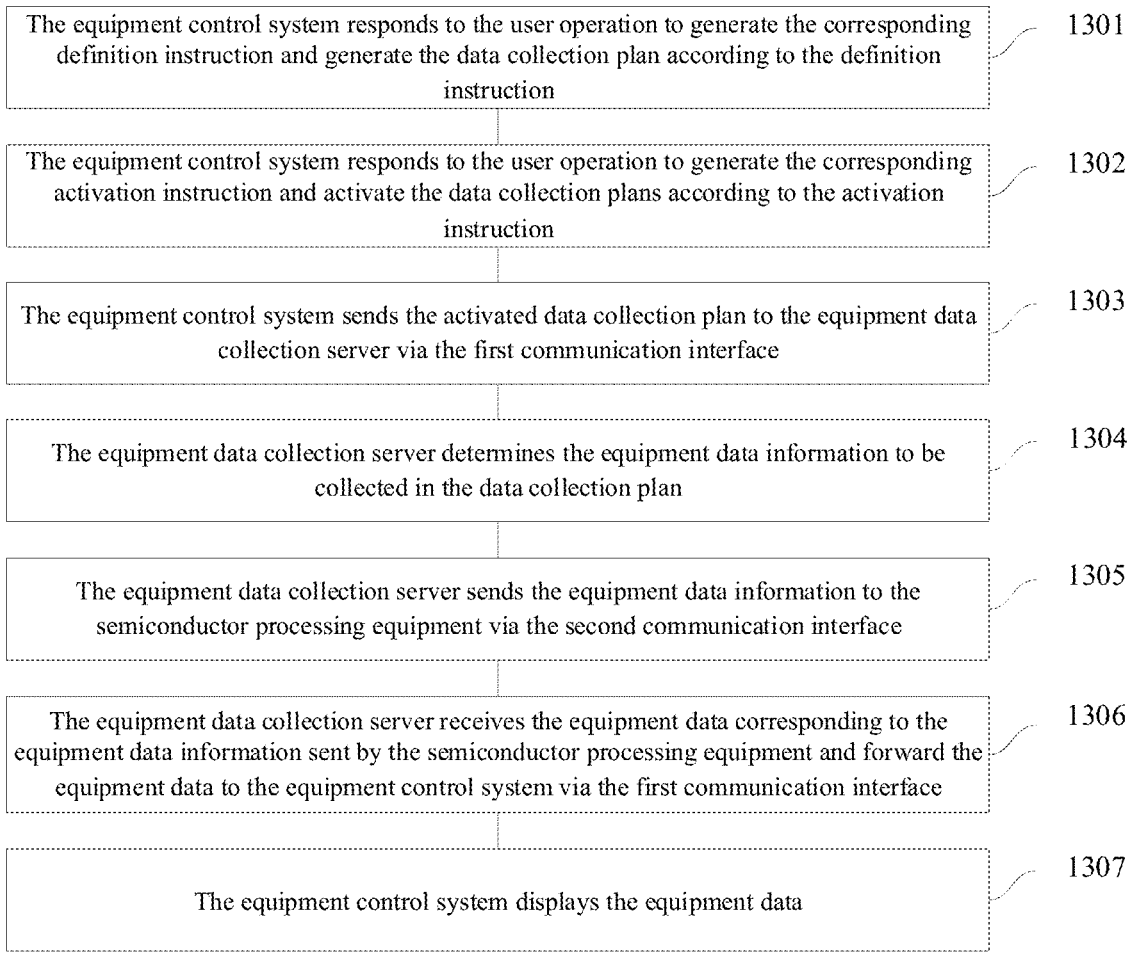
FIG. 13 illustrates a schematic flowchart of a semiconductor processing equipment data collection system according to embodiments of the present disclosure.

FIG. 13 illustrates a schematic flowchart of a semiconductor processing equipment data collection system according to embodiments of the present disclosure. In some embodiments, the data collection system of the semiconductor processing equipment includes an equipment data collection server and an equipment control system. The equipment data collection server can be communicatively connected to the equipment control system via the first communication interface. The equipment data collection server can be communicatively connected to the semiconductor processing equipment via the second communication interface.

The equipment control system can be configured to generate the corresponding definition instruction in response to the user operation and generate the data collection plan according to the definition instruction, generate the corresponding activation instruction in response to the user operation, activate the data collection plan according to the activation instruction, and send the activated data collection plan to the equipment data collection server via the first communication interface.

The equipment data collection server can be configured to determine the equipment data information to be collected in the data collection plan, send the equipment data information to the semiconductor processing equipment via the second communication interface, and receive the equipment data corresponding to the equipment data information sent by the semiconductor processing equipment and forward the equipment data to the equipment control system via the first communication interface.

The equipment control system can be further configured to display the equipment data.

The workflow of the data collection system of the semiconductor processing equipment can include the following steps.

At 1301, the equipment control system responds to the user operation to generate the corresponding definition instruction and generate the data collection plan according to the definition instruction.

At 1302, the equipment control system responds to the user operation to generate the corresponding activation instruction and activate the data collection plans according to the activation instruction.

At 1303, the equipment control system sends the activated data collection plan to the equipment data collection server via the first communication interface.

At 1304, the equipment data collection server determines the equipment data information to be collected in the data collection plan.

At 1305, the equipment data collection server sends the equipment data information to the semiconductor processing equipment via the second communication interface.

At 1306, the equipment data collection server receives the equipment data corresponding to the equipment data information sent by the semiconductor processing equipment and forwards the equipment data to the equipment control system via the first communication interface.

At 1307, the equipment control system displays the equipment data.

It should be noted that, for the detailed operation process of the data collection system of the semiconductor processing equipment in embodiments of the present disclosure, reference can be made to the description of the data collection process based on the equipment data collection server or the equipment control system. To avoid repetition, only a brief explanation is provided here.

In summary, in the embodiments of the present invention, the equipment data collection server can be communicatively connected to the equipment control system to perform the equipment data collection task issued by the equipment control system for the semiconductor processing equipment. In this method, the equipment data collection server can be configured to collect the equipment data, and the data may not need to be collected by the factory automated control system, which can reduce the data collection pressure of the software application at the factory end and improve the communication method between the data collection application and the equipment end.

It should be noted that, for method embodiments, for simplicity, method embodiments can be described as a series of action combinations. However, those skilled in the art should be aware that embodiments of the present disclosure are not limited by the order of actions described, because some steps can be performed in other orders or simultaneously according to embodiments of the present disclosure. Furthermore, those skilled in the art should know that embodiments described in the specification are preferred embodiments, and actions involved in embodiments of the present disclosure may not be necessarily mandatory in embodiments of the present disclosure.

Figure 14:
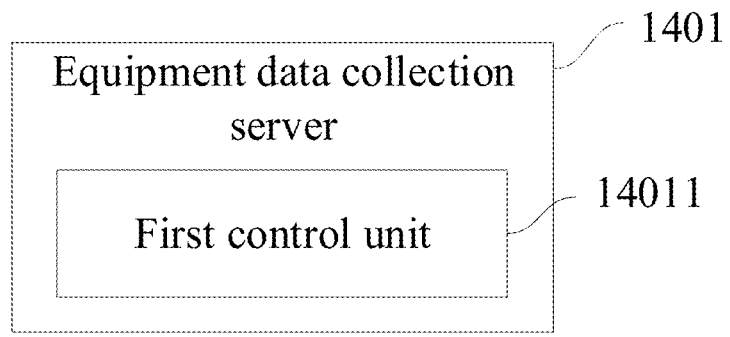
FIG. 14 illustrates a schematic structural block diagram of a semiconductor processing equipment data collection device according to embodiments of the present disclosure.

FIG. 14 illustrates a schematic structural block diagram of a semiconductor processing equipment data collection device according to embodiments of the present disclosure. The device can be applied to the equipment data collection server 1401. The equipment data collection can be communicatively connected to the equipment control system via the first communication interface. The equipment data collection server can be communicatively connected to the semiconductor processing equipment via the second communication interface. The device includes a first control unit 14011.

The first control unit 14011 can be configured to receive the activated data collection plan via the first communication interface, the data collection plan being generated by the equipment control system when receiving the definition instruction, send the data collection plan after receiving the activation instruction, the definition instruction and the activation instruction being generated by the equipment control system in response to the user operation, determine the equipment data information to be collected in the data collection plan, send the equipment data information to the semiconductor processing equipment via the second communication interface, receive the equipment data corresponding to the equipment data information sent by the semiconductor processing equipment, and forward the equipment data to the equipment control system via the first communication interface to display the equipment data.

In embodiments of the present disclosure, the semiconductor processing equipment can include the collection database. The equipment data can be obtained by the collection database using the data collection method corresponding to the data type of the equipment data information. The data type can include the parameter type, the alarm type, and the event type.

In embodiments of the present disclosure, the semiconductor processing equipment can also include the service database. If the data type is the alarm type, the equipment data can be obtained by the collection database from the semiconductor processing equipment. If the data type is the parameter type or the event type, the equipment data can be obtained by the collection database and the service database from the semiconductor processing equipment.

In embodiments of the present disclosure, the equipment control system can include the data structure converter based on the Interface A standard.

Displaying the equipment data includes performing the data format conversion on the equipment data by the data structure converter and displaying the equipment data after the data format conversion by the equipment control system.

In embodiments of the present disclosure, the equipment data collection server can include the third communication interface. The first control unit can be configured to receive the control instruction for the semiconductor processing equipment via the third communication interface and send the control instruction to the semiconductor processing equipment via the second communication interface. The control instruction can be generated and sent by other control systems besides the equipment control system in response to the user operation.

In embodiments of the present disclosure, the first communication interface and the second communication interface can be communications interfaces based on the Web Service protocol. The equipment data collection server can be the server based on the EDA standard, and the equipment control system can be the AGC system.

In embodiments of the present disclosure, the first control unit can be configured to determine whether the equipment data is the data to be collected in the activated data collection plan. If yes, the equipment data can be forwarded to the equipment control system via the first communication interface to display the equipment data.

In summary, in the embodiments of the present invention, the equipment data collection server can be communicatively connected to the equipment control system to perform the equipment data collection task issued by the equipment control system for the semiconductor processing equipment. In this method, the equipment data collection server can be configured to collect the equipment data, and the data may not need to be collected by the factory automated control system, which can reduce the data collection pressure of the software application at the factory end and improve the communication method between the data collection application and the equipment end.

Figure 15:
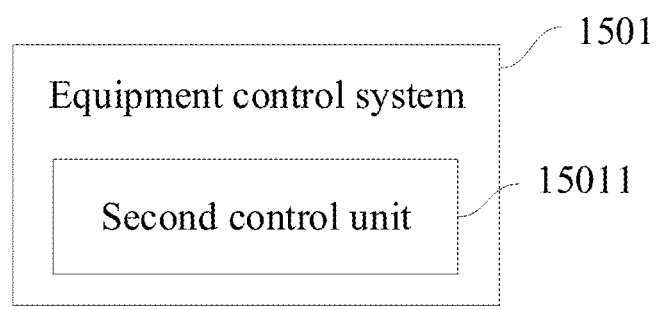
FIG. 15 illustrates a schematic structural block diagram of another semiconductor processing equipment data collection device according to embodiments of the present disclosure.

FIG. 15 illustrates a schematic structural block diagram of another semiconductor processing equipment data collection device according to embodiments of the present disclosure. The device is applied to the equipment control system 1501.

The equipment control system can be communicatively connected to the equipment data collection server via the first communication interface. The equipment data collection server can be communicatively connected to the semiconductor processing equipment via the second communication interface. The device includes a second control unit 15011.

The second control unit 15011 can be configured to generate the corresponding definition instruction in response to the user operation and generate the data collection plan according to the definition instruction, generate the corresponding activation instruction in response to the user operation, activate the data collection plan according t the activation instruction, send the activated data collection plan to the equipment data collection server via the first communication interface, receive the equipment data returned by the equipment data collection server via the first communication interface, and display the equipment data. The equipment data can be sent by the semiconductor processing equipment to the equipment data collection server according to the equipment data information after the equipment data collection server determines the equipment data information to be collected in the data collection plan and sends the equipment data information to the semiconductor processing equipment via the second communication interface.

In embodiments of the present disclosure, the semiconductor processing equipment can include the collection database. The equipment data can be obtained by the collection database using the data collection method corresponding to the data type in the equipment data information. The data type can include the parameter type, the alarm type, and the event type.

In embodiments of the present disclosure, the equipment control system can include the data structure converter based on the Interface A standard. The second control unit can be configured to display the equipment data after the data format is converted by the data structure converter.

In summary, in the embodiments of the present invention, the equipment data collection server can be communicatively connected to the equipment control system to perform the equipment data collection task issued by the equipment control system for the semiconductor processing equipment. In this method, the equipment data collection server can be configured to collect the equipment data, and the data may not need to be collected by the factory automated control system, which can reduce the data collection pressure of the software application at the factory end and improve the communication method between the data collection application and the equipment end.

Since device embodiments are similar to method embodiments, the description can be simple. For the relevant part, reference can be made to the description of method embodiments.

Embodiments of the present disclosure further provide an electronic device, including a processor, a memory, and a computer program stored in the memory and run at the processor. When the computer program is executed by the processor, the processes of data collection method embodiments of the semiconductor processing equipment can be realized, and the same technical effect can be achieved, which is not repeated here.

Embodiments of the present disclosure further provide a computer-readable storage medium. The computer-readable storage medium stores a computer program that, when the computer program is executed by the processor, causes the processor to realize the processes of data collection method embodiments of the semiconductor processing equipment can be realized, and the same technical effect can be achieved, which is not repeated here.

Since device embodiments are similar to method embodiments, the description can be simple. For the relevant part, reference can be made to the description of method embodiments.

Embodiments of the present disclosure are described progressively. Each embodiment focuses on the differences from other embodiments. Similar or identical aspects of embodiments can be cross-referenced.

Those skilled in the art should understand that embodiments of the present disclosure can be implemented as methods, devices, or computer program products. Therefore, embodiments of the present disclosure can include completely hardware embodiments, completely software embodiments, or a combination of software and hardware embodiments. Additionally, embodiments of the present disclosure can include the computer program products implemented on one or more computer-readable storage media including the computer programs (including but not limited to a magnetic disc storage device, CD-ROM, or an optical storage device).

Embodiments of the present disclosure are described with reference to flowcharts and/or block diagrams representing methods, terminal devices (systems), and computer program products of embodiments of the present disclosure. It should be understood that each flow and/or block in the flowcharts and/or block diagrams, as well as a combination of flows and/or blocks in the flowcharts and/or block diagrams, can be implemented by computer program instructions. The computer program instructions can be provided to a general-purpose computer, a special-purpose computer, an embedded processor, or another programmable data processing terminal device to produce a device that performs the functions specified in one or more flows of the flowchart and/or one or more blocks in the block diagram.

The computer program instructions can also be stored in a computer-readable storage medium that can guide a computer or other programmable data processing terminal device to operate in a specific manner to cause the instructions stored in the computer-readable storage device to generate a manufactured produce including the instruction device. The instruction device can realize the functions specified in one or more flows of the flowchart and/or one or more blocks in the block diagram.

The computer program instructions can also be loaded onto the computer or other programable data processing terminal equipment to cause the computer or the other programable data processing terminal equipment to perform a series of operation processes to generate the processing realized by the computer. Thus, the instructions executed on the computer or the other programable data processing terminal equipment can be used to realize the processes of the functions specified in one or more flows of the flowchart and/or one or more blocks in the block diagram.

Although preferred embodiments of the present disclosure have been described, those skilled in the art can make other modifications and changes to embodiments of the present disclosure once the basic creative concept is known. Therefore, the appended claims are intended to cover all changes and modifications within the scope of embodiments of the present disclosure.

Finally, it should be noted that in this document, relationship terms such as "first" and "second" are used solely to distinguish one entity or operation from another, and do not necessarily require or imply any actual relationship or order between these entities or operations. Furthermore, terms such as "comprising," "including," or any other variations thereof are intended to encompass non-exclusive inclusion, such that processes, methods, articles, or terminal devices comprising a series of elements include not only those elements but also other elements not explicitly listed, or even elements that are inherent to the processes, methods, articles, or terminal devices. When there is no more limitation, an element defined by the phrase "comprising a . . . " does not exclude the presence of additional identical elements in the processes, methods, articles, or terminal devices comprising the elements.

The data collection method, the data collection device, and the data collection system of the semiconductor processing equipment are described in detail above. Specific examples have been used to explain the principles and embodiments of the present disclosure. The description of the above embodiments is provided to facilitate the understanding of the methods and core ideas of the present disclosure. Meanwhile, for those skilled in the art, there may be changes in specific embodiments and applications according to the ideas of the present disclosure. In summary, the content of the present specification should not be understood as limiting the present disclosure.

What is claimed is:

1. A data collection method of semiconductor processing equipment, applied to an equipment data collection server, the equipment data collection server being communicatively connected to an equipment control system via a first communication interface, the equipment data collection server being communicatively connected to the semiconductor processing equipment via a second communication interface, and the equipment control system being an AGC system for monitoring and managing the semiconductor processing equipment, the method comprising:
 receiving an activated data collection plan via the first communication interface, the data collection plan being generated by the equipment control system after receiving a definition instruction and being sent after receiving an activation instruction, and the definition instruction and the activation instruction being generated by the equipment control system in response to a user operation;
 determining equipment data information to be collected in the data collection plan;
 sending the equipment data information to the semiconductor processing equipment via the second communication interface; and
 receiving equipment data corresponding to the equipment data information sent by the semiconductor processing equipment and forwarding the equipment data to the equipment control system via the first communication interface to display the equipment data;
 wherein:
  the equipment control system includes a data structure converter based on an Interface A standard; and
  displaying the equipment data includes performing data format conversion on the equipment data by the data structure converter and displaying the equipment data after the data format conversion by the equipment control system.

2. The method according to claim 1, wherein:
 the semiconductor processing equipment includes a collection database; and
 the equipment data is obtained by the collection database using a data collection method corresponding to a data type in the equipment data information, wherein the data type includes a parameter type, an alarm type, and an event type.

3. The method according to claim 2, wherein:
 the semiconductor processing equipment further includes a service database;
 if the data type is the alarm type, the equipment data is obtained by the collection database from the semiconductor processing equipment; and
 if the data type is the parameter type or the event type, the equipment data is obtained by the collection database and the service database from the semiconductor processing equipment.

4. The method according to claim 1,
 wherein the equipment data collection server includes a third communication interface,
 the method further comprising:
  receiving a control instruction for the semiconductor processing equipment via the third communication interface, the control instruction being generated and sent by control systems other than the equipment control system in response to a user operation; and
  sending the control instruction to the semiconductor processing equipment via the second communication interface for execution.

5. The method according to claim 1, wherein:
 the first communication interface and the second communication interface are communication interfaces based on a Web Service protocol; and
 the equipment data collection server is a server based on an EDA standard.

6. The method according to claim 1, further comprising, before forwarding the equipment data to the equipment control system via the first communication interface to display the equipment data:
 determining whether the equipment data is equipment data to be collected in the activated data collection plan; and
 if yes, forwarding the equipment data to the equipment control system via the first communication interface to display the equipment data.

7. A data collection method of semiconductor processing equipment, applied to an equipment control system, the equipment control system being communicatively connected to an equipment data collection server via a first communication interface, the equipment control system being communicatively connected to the semiconductor processing equipment via a second communication interface, and the equipment control system being an AGC system for monitoring and managing the semiconductor processing equipment, the method comprising:
 responding to a user operation to generate a corresponding definition instruction and a data collection plan according to the definition instruction;
 responding to the user operation to generate a corresponding activation instruction and activate the data collection plan according to the activation instruction;
 sending the activated data collection plans to the equipment data collection server via the first communication interface;
 receiving the equipment data returned by the equipment data collection server via the first communication interface, the equipment data being sent to the equipment data collection server by the semiconductor processing equipment according to equipment data information after the equipment data collection server determines the equipment data information to be collected in the data collection plan and sends the equipment data information to the semiconductor processing equipment via the second communication interface; and displaying the equipment data;

wherein:

the equipment control system includes a data structure converter based on an Interface A standard; and displaying the equipment data includes displaying the equipment data after the data structure converter performs data format conversion.

8. The method according to claim 7, wherein:

the semiconductor processing equipment includes a collection database; and the equipment data is obtained by the collection database using a data collection method corresponding to a data type in the equipment data information, wherein the data type includes a parameter type, an alarm type, and an event type.

9. The method according to claim 8, wherein:

the semiconductor processing equipment further includes a service database;

if the data type is alarm type, the equipment data is obtained by the collection database from the semiconductor processing equipment; and if the data type is the parameter type or event type, the device data is obtained by the collection database and the service database from the semiconductor processing equipment.

10. A data collection device of semiconductor processing equipment, applied to an equipment data collection server, the equipment data collection server being communicatively connected to the equipment control system via a first communication interface, the equipment data collection server being communicatively connected to the semiconductor processing equipment via a second communication interface, and the equipment control system being an AGC system for monitoring and managing the semiconductor processing equipment, the device comprising:

a first control unit configured to receive an activated data collection plan via the first communication interface, the data collection plan being generated by the equipment control system after receiving a definition instruction and being sent after receiving an activation instruction, and the definition instruction and the activation instruction being generated by the equipment control system in response to a user operation, determine equipment data information to be collected in the data collection plan, send the equipment data information to the semiconductor processing equipment via the second communication interface, and receive equipment data corresponding to the equipment data information sent by the semiconductor processing equipment and forwarding the equipment data to the equipment control system via the first communication interface to display the equipment data;

wherein:

the equipment control system includes a data structure converter based on an Interface A standard; and displaying the equipment data includes performing data format conversion on the equipment data by the data structure converter and displaying the equipment data after the data format conversion by the equipment control system.

* * * * *